United States Patent
Roh et al.

(10) Patent No.: US 7,907,581 B2
(45) Date of Patent: Mar. 15, 2011

(54) METHOD AND SYSTEM FOR SUPPORTING MULTI MESH OPERATION MODES USING SINGLE WI-FI INTERFACING

(75) Inventors: Yong Sung Roh, Icheon-si (KR); Jae Hoon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 859 days.

(21) Appl. No.: 11/782,273

(22) Filed: Jul. 24, 2007

(65) Prior Publication Data

US 2008/0259845 A1 Oct. 23, 2008

(30) Foreign Application Priority Data

Apr. 17, 2007 (KR) ........................ 10-2007-0037489

(51) Int. Cl.
*H04L 12/64* (2006.01)
(52) U.S. Cl. ........................................ 370/338; 370/465
(58) Field of Classification Search .................. 370/338, 370/465
See application file for complete search history.

(56) References Cited

U.S. PATENT DOCUMENTS

| 2006/0182073 | A1 | 8/2006 | Pani et al. | |
|---|---|---|---|---|
| 2006/0262762 | A1 | 11/2006 | Cho et al. | |
| 2007/0253344 | A1* | 11/2007 | Frost et al. | 370/254 |
| 2008/0170527 | A1* | 7/2008 | Lundsgaard et al. | 370/312 |
| 2010/0142555 | A1* | 6/2010 | Yang et al. | 370/473 |
| 2010/0232400 | A1* | 9/2010 | Patil et al. | 370/337 |

FOREIGN PATENT DOCUMENTS

| KR | 1996-27463 | 7/1996 |
|---|---|---|
| KR | 2006-117189 | 11/2006 |
| KR | 2006-130496 | 12/2006 |

* cited by examiner

*Primary Examiner* — Melvin Marcelo
(74) *Attorney, Agent, or Firm* — NSIP Law, P.C.

(57) ABSTRACT

A wireless-fidelity (Wi-Fi) interfacing method and a Wi-Fi interfacing system are provided. The Wi-Fi interfacing method includes: determining an interfacing operation mode related to a received packet, in interoperation with the receiving of the packet; and processing the packet via a single Wi-Fi interface, according to the determined interfacing operation mode. The Wi-Fi interfacing system includes: an operation mode determination unit determining an interfacing operation mode related to a received packet, in interoperation with the receiving of the packet; and a packet processing unit processing the packet via a single Wi-Fi interface, according to the determined interfacing operation mode.

35 Claims, 5 Drawing Sheets

METHOD AND SYSTEM FOR SUPPORTING MULTI MESH OPERATION MODES USING SINGLE WI-FI INTERFACING

CROSS-REFERENCE TO RELATED APPLICATION

This application claims the benefit of Korean Patent Application No. 2007-0037489, filed on Apr. 17, 2007 in the Korean Intellectual Property Office, the disclosure of which is incorporated herein by reference.

BACKGROUND OF THE INVENTION

1. Field of the Invention

Aspects of the present invention relate to a wireless-fidelity (Wi-Fi) interfacing method and system using the method which supports a mesh operation mode using a single Wi-Fi interface.

2. Description of the Related Art

A wireless network under the IEEE 802.11 standard is generally performed by an access point which provides a wireless network of a basic service set (BSS). The BSS is identified by a unique value of a service set identifier (SSID), and stations within the BSS (hereinafter, these are referred to as BSS objects), which need a wireless service, ascertain whether a joinable network exists via scanning, connect with a corresponding access point when the joinable network exists, and use the wireless service when being connected to the access point.

A need for a mesh function which supports a multi-hop environment has been under discussion, and standardization with respect to the mesh function is briskly under conduction in IEEE 802.11s Task Group (TG). In contrast with a conventional BSS network, the mesh function supports direct communication between nodes (these are referred to as mesh points), and has a characteristic of a multi-hop environment, the multi-hop environment relaying a packet being transmitted from another node to an appropriate mesh point. In such a new kind of network, establishment is simple, and network expansion is easily performed without interoperating with a wired network since networking is automatically configured when a power is supplied. Accordingly, a network structure of the mesh point is dynamic and flexible, in contrast with the conventional BSS network.

A mesh access point, which combines the access point function with a mesh point function, is provided. Similar to the access point, the mesh access point relays a packet being transmitted from a BSS object by providing a conventional wireless network service, the BSS object using a corresponding network service. In this instance, each of a mesh basic service set (MBSS) and the BSS is generally supported on a different network interface since the each of the MBSS and the BSS is differently operated under a different condition. However, as a number of interfaces becomes great, a size of a communication terminal becomes greater, accordingly manufacturing costs becomes greater.

Accordingly, a new technique which can effectively process Wi-Fi interfacing and can solve problems of the conventional art by using a single Wi-Fi interface in the course of supporting a plurality of mesh operation modes is disclosed in the specification of the present invention.

SUMMARY OF THE INVENTION

Aspects of the present invention provide a wireless-fidelity (Wi-Fi) interfacing method and system using the method which simultaneously processes both an access point function and a mesh point function by using a single Wi-Fi interface.

The present invention also provides a Wi-Fi interfacing method and system using the method which can reduce manufacturing costs and reduce a size a communication terminal since a mesh access point (MAP) function is processed by using a single Wi-Fi interface.

The present invention also provides a Wi-Fi interfacing method and system using the method which can effectively perform network communication since both an access point function and a mesh point function are simultaneously processed by using a single Wi-Fi interface.

The present invention also provides a Wi-Fi interfacing method and system using the method which supports communication between a station being located in a BSS and a mesh point by using a single Wi-Fi interface.

According to an aspect of the present invention, there is provided a Wi-Fi interfacing method including: determining an interfacing operation mode related to a received packet, in interoperation with the receiving of the packet; and processing the packet via a single Wi-Fi interface, according to the determined interfacing operation mode.

According to another aspect of the present invention, there is provided a Wi-Fi interfacing system including: an operation mode determination unit determining an interfacing operation mode related to a received packet, in interoperation with the receiving of the packet; and a packet processing unit processing the packet via a single Wi-Fi interface, according to the determined interfacing operation mode.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF EMBODIMENTS

Reference will now be made in detail to present embodiments of the present invention, examples of which are illustrated in the accompanying drawings, wherein like reference numerals refer to the like elements throughout. The exemplary embodiments are described below in order to explain the present invention by referring to the figures.

Figure 1:
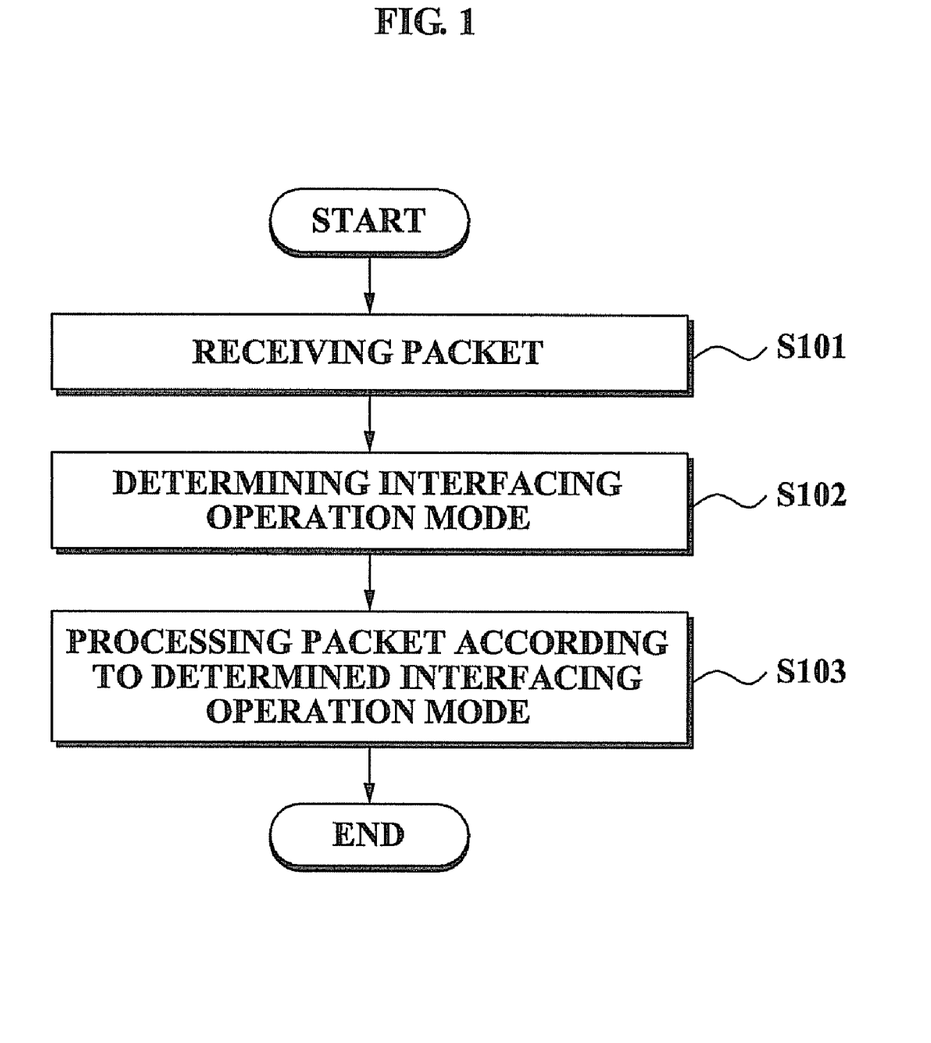
FIG. 1 is a flowchart illustrating a single Wi-Fi interfacing method according to an embodiment of the present invention.

FIG. 1 is a flowchart illustrating a single Wi-Fi interfacing method according to an embodiment of the present invention.

As illustrates in FIG. 1, a system using the Wi-fi interfacing method according to the embodiment of the present invention, receives a packet from a basic service set (BSS) or a mesh basic service set (MBSS) in operation S101, and determines an interfacing operation mode related to the received packet in operation S102. Also, the system processes the received packet via a single Wi-Fi interface according to the determined interfacing operation mode in operation S103.

Specifically, the system according to the present embodiment may be applied to communication terminals which can be interpretable using a BSS object of the BSS or a mesh point of the MBSS. The system according to the present embodiment verifies the received packet to determine an interfacing operation mode when receiving packets from other BSS objects or other mesh points. The system according to the present embodiment verifies the received packet to determine the interfacing operation mode using a single Wi-Fi interface. As an example, the system according to the present embodiment determines the interfacing operation mode as either an access point operation mode or a mesh point operation mode depending on the received packet. When the system of the present embodiment determines the interfacing operation mode as the access point operation mode, the system of the present embodiment transmits the received packet to a BSS object which corresponds to a BSS, and processes the interfacing operation mode as the access point operation mode. When the system of the present invention determines the interfacing operation mode as the mesh point operation mode, the system of the present embodiment transmits the received packet to an MBSS object which corresponds to an MBSS, and processes the interfacing operation mode as the MP operation mode.

The MP operation mode which is continuously used in the current specification of the present embodiment indicates a conventional access point operation mode, and the access point operation mode is performed by the BSS object. Also, the mesh point operation mode indicates a conventional mesh point operation mode, and the mesh point operation mode is performed by the MBSS object. That is, according to the present invention, both a conventional access point operation mode and a conventional mesh point operation mode may be simultaneously supported by using a single interface.

To describe the present embodiment in more detail, the system according to the present embodiment verifies whether the received packet includes media access control (MAC) address information about the BSS object, which corresponds to the BSS, to determine the interfacing operation mode. As a result of the verifying, when the received packet includes the MAC address information about the BSS object, the interfacing operation mode can be determined as the access point operation mode. Also, the system according to the present embodiment verifies whether the received packet includes MAC address information about the MBSS object, which corresponds to the MBSS. As a result of the verifying, when the received packet includes the MAC address information about the MBSS object, the interfacing operation mode can be determined as the mesh point operation mode. Consequently, the system using the Wi-Fi interfacing method according to the present embodiment can be flexibly operated either as the access point function or the mesh point function, depending on the received packet.

In another embodiment of the present invention, the system according to the present embodiment stores BSS profile information which corresponds to the BSS and MBSS profile information which corresponds to the MBSS in order to determine an interfacing operation mode. A BSSID, an SSID, and whether to activate a mesh function are included in the profile information, and in addition, whether to activate an access point function, whether an ad-hoc mode exists, and channel information of a present BSS may be included in the profile information. The system according to the present embodiment verifies which profile information of the BSS profile information and MBSS profile information corresponds to the received packet in operation S102. As a result of the verifying, the system according to the present embodiment either determines the interfacing operation mode as an access point operation mode when the received packet corresponds to the BSS profile information, or determines the interfacing operation mode as an mesh point operation mode when the received packet corresponds to the MBSS profile information. As an example, the system according to the present embodiment verifies whether a BSSID of the received packet corresponds to the BSS profile information, and as a result of the verifying, when the BSSID corresponds to the BSS profile information, determines the interfacing operation mode as the access point operation mode in operation S103. As another example, in order to determine the interface operation mode, the system according to the present embodiment verifies whether the BSSID is established as a broadcast address in the received packet and whether a mesh element identifier is included in the received packet. As a result of the verifying, when the BSSID is established as the broadcast address in the received packet, the system according to the present embodiment determines the interfacing operation mode as the interfacing operation mode, and when the mesh element identifier is included in the received packet, the system according to the present embodiment determines the interfacing operation mode as the mesh point operation mode. That is, when the BSSID of the received packet is established as the broadcast address of 'FF:FF:FF:FF:FF:FF', the system according to the present embodiment verifies whether the mesh element identifier is included in the received packet, and determines the interfacing operation mode as the mesh point operation mode when the mesh element identifier is included in the received packet.

The system according to the present invention can receive a packet of a data frame type from a network. In this instance, the system according to the present invention can determine the interfacing operation mode by ascertaining an address type of the received data frame. That is, the system according to the present invention ascertains the address type of the data frame received when the received packet is a data frame in operation S102, and determines the interfacing operation mode as the access point operation mode when the received packet is a 3-address frame type. Also, similar to the above operation, the system according to the present invention determines the interfacing operation mode as the MP operation mode when the address type of the received data frame is a 4-address frame type.

Consequently, when the Wi-Fi interfacing method according to the present invention is applied to a system, manufacturing costs of a communication terminal can be reduced, and a size of the communication terminal can be reduced since a mesh access point function is processed using a single Wi-Fi interface.

Also, according to the present invention, communication between a station being located in a BSS and a mesh point can be effectively supported by using a single Wi-Fi interface.

A Wi-Fi interfacing method according to the present invention can support an access point operation mode or a mesh point operation mode by initializing a single Wi-Fi interface, which will be described in detail with reference to FIG. 3.

Figure 2:
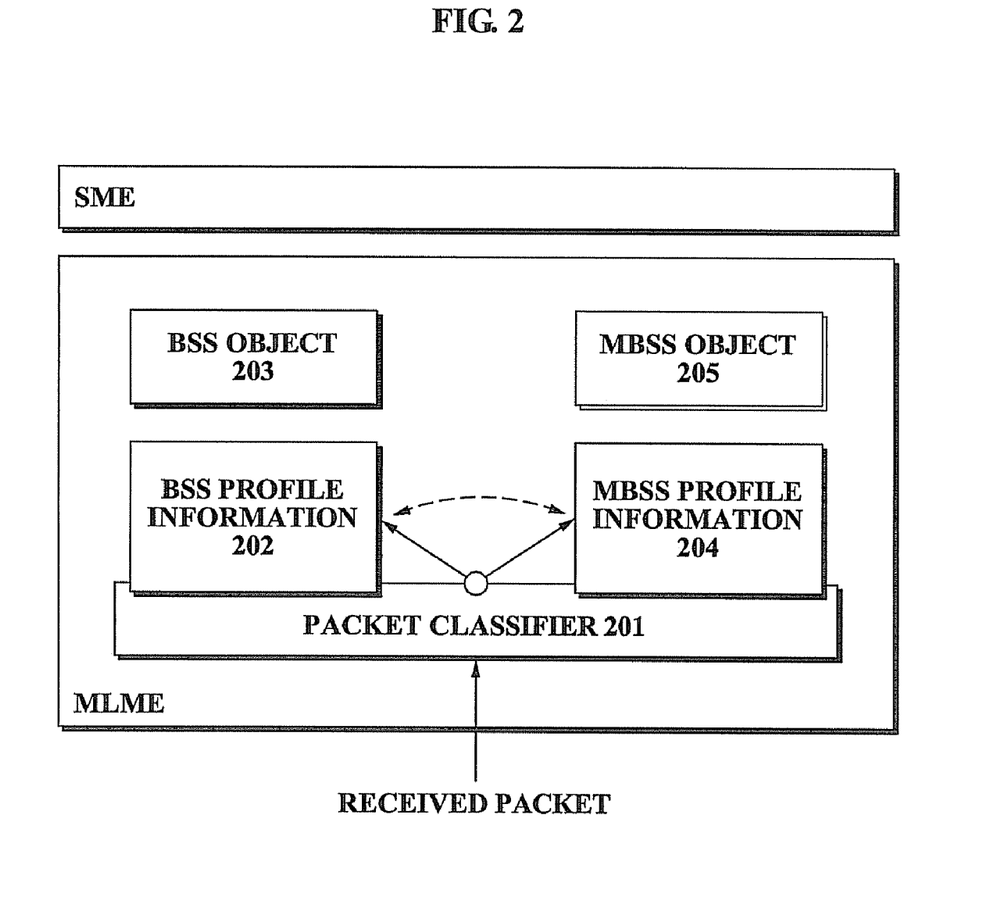
FIG. 2 is a diagram illustrating MAC layer management entity (MLME) according to an embodiment of the present invention.

FIG. 2 is a diagram illustrating MAC layer management entity (MLME) according to an embodiment of the present invention.

Referring to FIG. 2, in a system according to the present invention, BSS objects 203 for implementing a conventional access point function and MBSS objects 205 for implementing a mesh point function are embodied in an MLME layer of an entity controlling a MAC layer. That is, the system receiving a packet classifies received packets using a packet classifier 201, and determines whether to refer to BSS profile information 202 to transmit to a BSS object 203 according to the classification of the packet classifier 201, or determines whether to refer to MBSS profile information 204 to transmit an MBSS object 205. Accordingly, the system according to the present invention can implement the access point function or the mesh point function via the packet classifier 201. For this, the system according to the present embodiment manages both the BSS profile information 202 for BSS communication and MBSS profile information 204 for MBSS communication.

Figure 3:
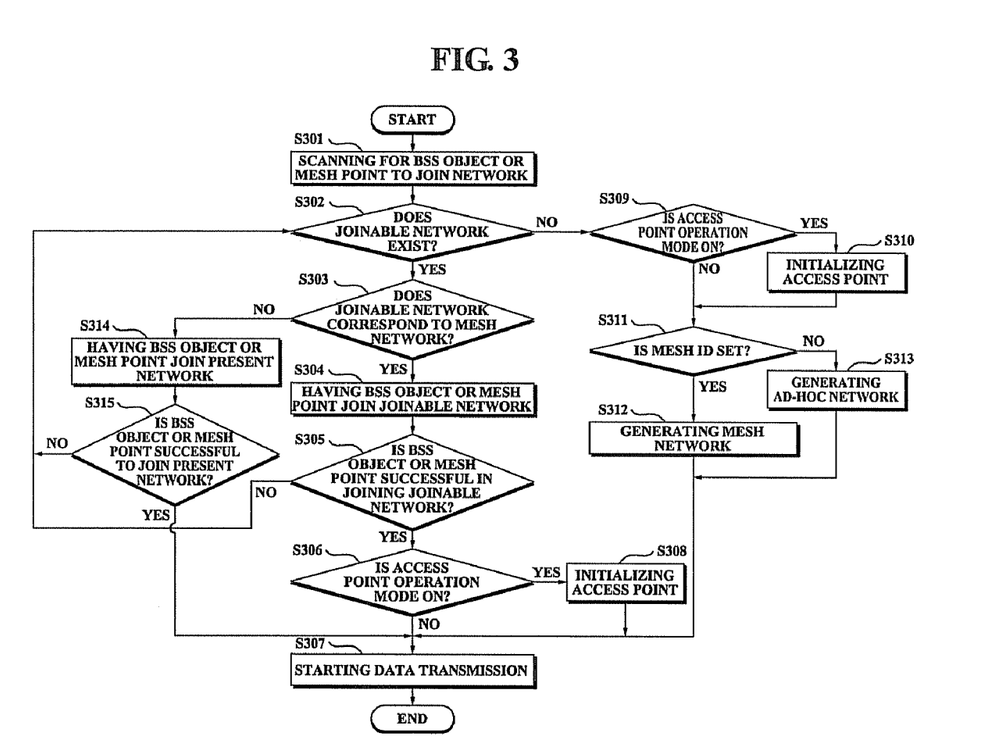
FIG. 3 is a flowchart illustrating a method for initializing according to an embodiment of the present invention.

FIG. 3 is a flowchart illustrating a method for initializing according to an embodiment of the present invention.

A system applying a Wi-Fi interfacing method according to an embodiment of the present invention initializes a single Wi-Fi interface to support an access point operation mode or a mesh point operation mode. That is, the system provides an initialization function to prevent a possible problem from occurring since all functions are simultaneously initialized when a mesh point configuring a network is separated from the corresponding network, and when an existing network is released.

Hereinafter, the method for initializing the Wi-Fi interface will be described.

The system according to the present invention initially performs network initialization of a BSS object or a mesh point, which require scanning. For initialization, in the single Wi-Fi interface, the system according to the present embodiment initializes the mesh point operation mode, and subsequently initializes the access point operation mode.

Specifically, in operation S301, the system according to the present invention scans for the BSS object and the mesh point to join a network. That is, the system according to the present embodiment verifies whether the network with respect to a neighboring mesh point is released, and scans the BSS object of the BSS or the neighboring mesh point when the network is released.

Next, as a result of the verifying in operation S301, the system according to the present embodiment ascertains whether a joinable network exists in operation S302.

According to an embodiment of the present invention, the system according to the present embodiment determines the joinable network exists when the neighboring mesh point exists. Specifically, the system according to the present invention verifies whether a beacon message is received in the neighboring mesh point, and determines that the neighboring mesh point does not exist when the beacon message is not received in the neighboring mesh point for a predetermined time.

When the joinable network exists, the system according to the present embodiment verifies whether the joinable network is a mesh network in operation S303. When the joinable network is the mesh network, the system according to the present embodiment has the BSS object or the mesh point join the joinable network in operation S304. The system according to the present embodiment verifies whether the BSS object or the mesh point is successful in joining the joinable network in operation S305, and verifies whether an operation mode of a present access point is in mode ON when the BSS object or the mesh point is successful in joining the joinable network in operation S306. When the system according to the present embodiment verifies that the operation mode of the present access point is in mode OFF, the system according to the present embodiment starts data transmission using the joined network in operation S307. Also, as a result of operation S306, when the system according to the present embodiment verifies that the operation mode of the present access point is in mode ON, the system according to the present embodiment initializes the access point in operation S308, and then starts data transmission in operation S307.

The system according to an embodiment of the present invention initializes the operation mode of the access point in correspondence to initialization of the operation mode of the mesh point, as described with reference to operations 301 through 307.

Specifically, as a result of operation S302, when the joinable network does not exist, the system according to the present embodiment performs operation S309, and verifies whether the operation mode of the access point is in mode ON. The system according to the present embodiment initializes the access point in mode ON in operation S310, and then performs operation S311. Conversely, as a result of operation S309, when the operation mode of the access point is in mode OFF, system according to the present embodiment directly performs operation S311 without initializing the access point. That is, as a result of operation S302, the system according to the present embodiment verifies the joinable network does not exist since the neighboring mesh point does not exist, and performs operation S311 to generate a new MBSS.

In operation S311, the system according to the present embodiment verifies whether a mesh ID is set, the mesh ID identifying the MBSS. When the mesh ID is set, the system according to the present embodiment generates a mesh network, which is identified using the mesh ID, in operation S312, and starts data transmission using the generated mesh network in operation S307. Also, when the mesh ID is not set, the system according to the present embodiment generates an ad-hoc network in operation S313, and starts data transmission in operation S307.

Also, when the joinable network is not the mesh network as a result of operation S303, the system according to an embodiment of the present invention determines that the joinable network is a network being implemented on an access point operation mode, joins a present network in operation S314, verifies whether the BSS object or the mesh point is successful in joining the present network in operation S315, when the BSS object or the mesh point joins the present network, and then performs operation S307 to start data transmission via the present network. Also, as a result of operation 315, when the system does not join the present network, the system according to the present embodiment goes to operation 302 to repeatedly verify whether a joinable network exists.

In brief, the system using the Wi-Fi interfacing method of the present embodiment either joins a corresponding network by performing network initialization of either the BSS object or the mesh point, or directly generates a network when a joinable network for a mesh point does not exist.

Therefore, the system using the Wi-Fi interfacing method of the present embodiment can prevent a network release that can occur in the course of initializing an access point function and a mesh point function.

The system using the Wi-Fi interfacing method according the present embodiment can release a present network, or connect to another network. Specifically, the system using the Wi-Fi interfacing method according the present embodiment receives a beacon message from the other network, determines whether to connect to the other network according to the received beacon message, and either connects to the other network or maintains the present network according to the determination. Accordingly, the system using the Wi-Fi interfacing method according the present embodiment can provide more effective communication by connecting to an optimized network. As a specific example, the system using the Wi-Fi interfacing method according the present embodiment can determine whether to connect to the other network by referring to an SSID) list from the received beacon message. Also, the system using the Wi-Fi interfacing method according the present embodiment can determine whether to connect to the other network by ascertaining signal strength of the received beacon message. As an example, the system using the Wi-Fi interfacing method according the present embodiment maintains a threshold value of the signal strength of the beacon message, and determines to connect to the other network when a beacon message having a strength greater than the threshold value is received from the other network.

Figure 4:
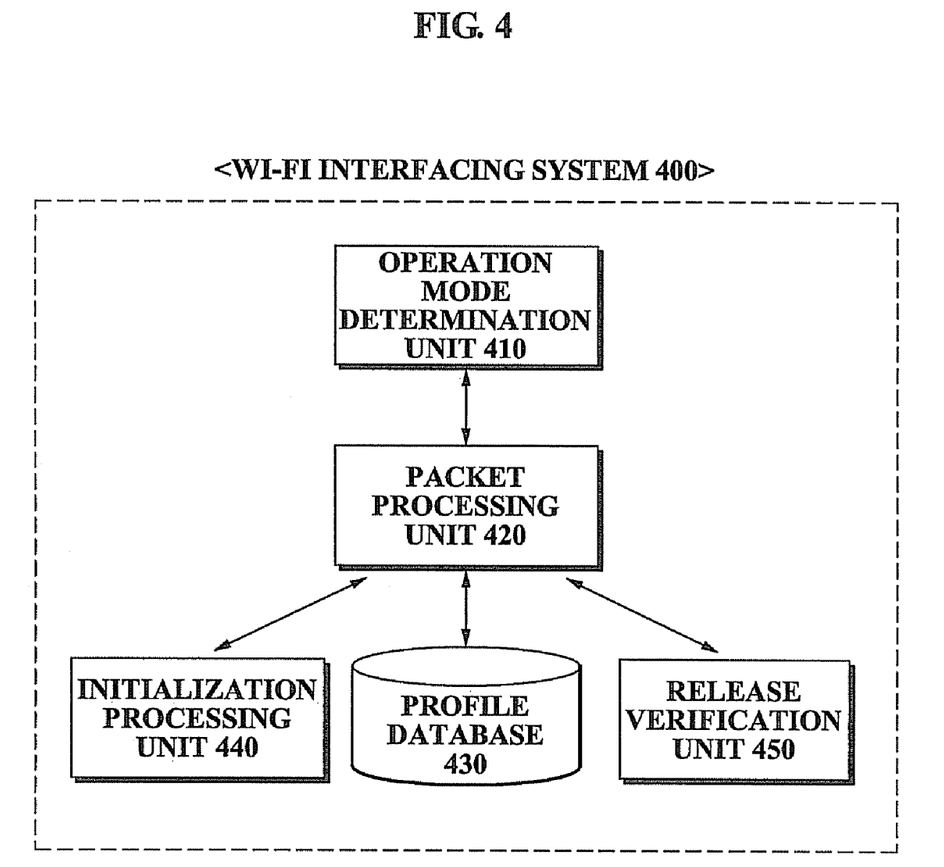
FIG. 4 is a diagram illustrating a single Wi-Fi interfacing system according to an embodiment of the present invention.
Figure 5:
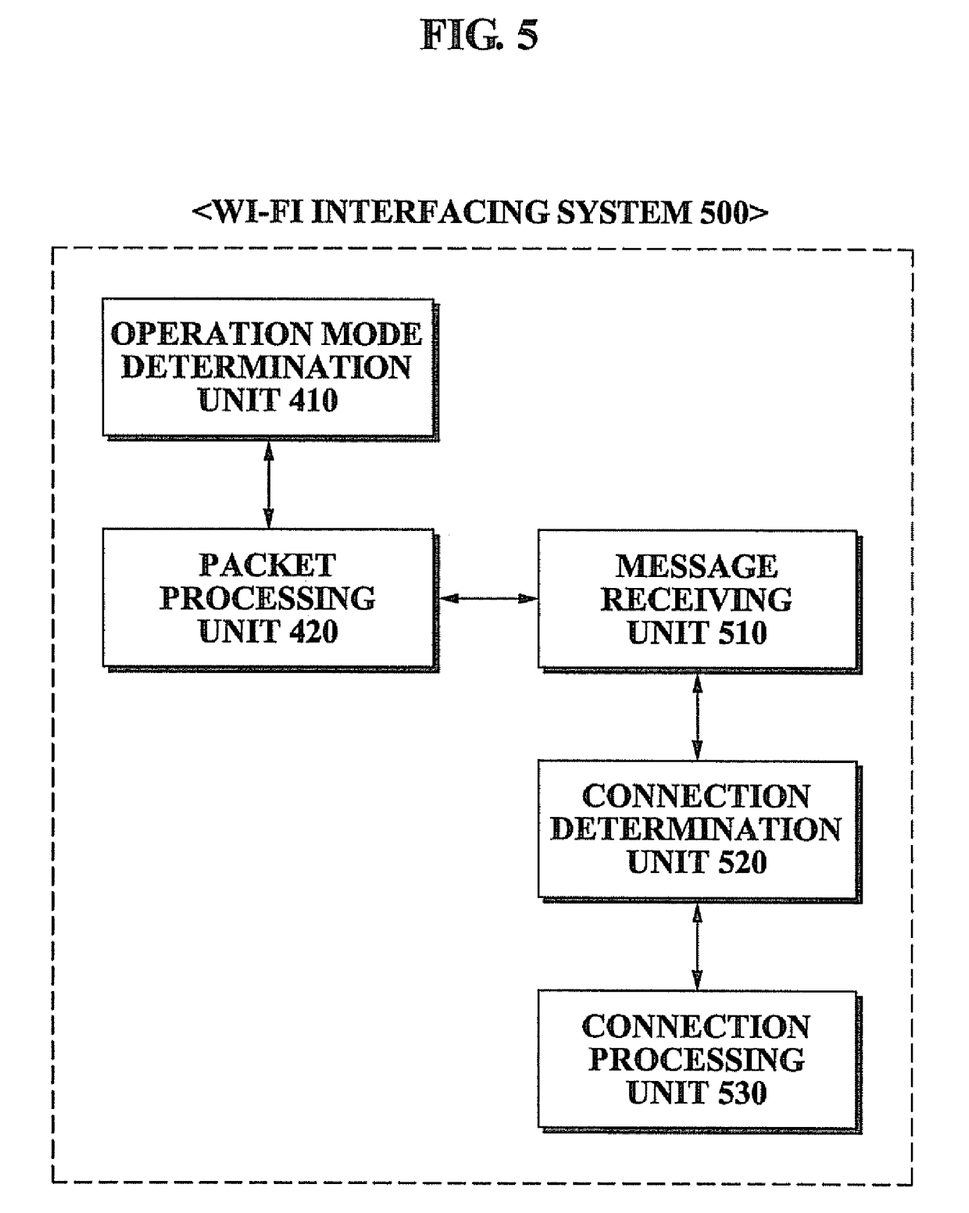
FIG. 5 is a diagram illustrating a single Wi-Fi interfacing system according to another embodiment of the present invention.

The system using the Wi-Fi interfacing method according to the present embodiment can be described via a Wi-Fi interfacing system 400 and 500, as illustrated in FIGS. 4 and 5.

FIG. 4 is a diagram illustrating a single Wi-Fi interfacing system 400 according to an embodiment of the present invention.

Referring to FIG. 4, the single Wi-Fi interfacing system 400 according to the embodiment of the present invention includes an operation mode determination unit 410 and a packet processing unit 420.

The operation mode determination unit 410 determines an interfacing operation mode related to a received packet, in interoperation with the receiving of the packet, and the packet processing unit 420 processes the packet via a single Wi-Fi interface, according to the determined interfacing operation mode.

The packet processing unit 420 either transmits the received packet to a BSS object which corresponds to a BSS and processes the interfacing operation mode as an access point operation mode, or transmits the received packet to an MBSS object which corresponds to an MBSS, and processes the interfacing operation mode as a mesh point operation mode.

Specifically, the operation mode determination unit 410 verifies whether the received packet includes network address information about the BSS object, the BSS object corresponding to the BSS, and as a result of the verifying, when the received packet includes the network address information about the BSS object, determines the interfacing operation mode as an access point operation mode. Also, the operation mode determination unit 410 verifies whether the received packet includes network address information about an MBSS object, the MBSS object corresponding to the MBSS, and as a result of the verifying, when the received packet includes the network address information about the MBSS object, determines the interfacing operation mode as a mesh point operation mode. Consequently, the system using the Wi-Fi interface method according to the present invention can be flexibly operated as an access point function or a mesh point function according to the received packet.

The packet processing unit 420 verifies whether a BSSID is established as a broadcast address in the received packet and whether a mesh element identifier is included in the received packet, and as a result of the verifying, when the BSSID is established as the broadcast address in the received packet, and when the mesh element identifier is included in the received packet, determines the interfacing operation mode as the mesh point operation mode. That is, when the BSSID of the received packet is established as the broadcast address of 'FF:FF:FF:FF:FF:FF', the packet processing unit 420 verifies whether the mesh element identifier is included in the received packet, and determines the interfacing operation mode as the mesh point operation mode when the mesh element identifier is included in the received packet. As another example, the packet processing unit 420 ascertains an address type of the received packet when the received packet is a data frame, and determines the interfacing operation mode as an access point operation mode when the received packet is a 3-address frame type, or determines the interfacing operation mode as the MP operation mode when the address type of the received data frame is a 4-address frame type.

Consequently, when the Wi-Fi interfacing system 400 according to the embodiment of the present invention is applied, manufacturing costs of a communication terminal can be reduced, and a size of the communication terminal can be reduced since a mesh access point function is processed using a single Wi-Fi interface. Also, according to the present invention, communication between a station being located in a BSS and a mesh point can be effectively supported using a single Wi-Fi interfacing system 400.

A Wi-Fi interfacing system 400 according to another embodiment of the present invention further includes a profile database 430, the profile database 430 storing BSS profile information which corresponds to a BSS and MBSS profile information which corresponds to a MBSS. In this instance, a BSSID, an SSID, and whether to activate a mesh function are included in the profile information, and in addition, whether to activate an access point function, whether an ad-hoc mode exists, and channel information of a present BSS may be included in the profile information.

When the Wi-Fi interfacing system 400 further includes the profile database 430, the operation mode determination unit 410 can verify which profile information of the BSS profile information and MBSS profile information corresponds to the received packet by referring to the profile database 430. As a result of the verifying, the operation mode determination unit 410 either determines the interfacing operation mode as an access point operation mode when the received packet corresponds to the BSS profile information, or, determines the interfacing operation mode as an mesh point operation mode when the received packet corresponds to the MBSS profile information.

As an example, when the Wi-Fi interfacing system 400 further includes the profile database 430, the operation mode determination unit 410 verifies whether a BSSID of the received packet corresponds to the BSS profile information, and as a result of the verifying, when the BSSID corresponds to the BSS profile information, determines the interfacing operation mode as the access point operation mode.

The Wi-Fi interfacing system 400 according to still another embodiment of the present invention further includes an initialization processing unit 440, the initialization processing unit 440 initializing the single Wi-Fi interface.

As an example, the initialization processing unit 440 initializes an MBSS object for initialization of the mesh point operation mode, and initializes a BSS object for initialization of the access point operation mode. That is, the initialization processing unit 440 may prevent a possible problem from occurring since all functions are simultaneously initialized when a mesh point configuring a network is separated from the corresponding network, and when an existing network is released.

The Wi-Fi interfacing system 400 according to yet another embodiment of the present invention further includes a release verification unit 450, the release verification unit 450 determining that a network with respect to a neighboring mesh point is released. As a result of the determination of the release verification unit 450, when the network with respect to the neighboring mesh point is released, the initialization processing unit 440 scans either the BSS object of the BSS or the neighboring mesh point, initializes a corresponding network after the scanning, and consequently initializes the access point operation mode which provides the BSS. As an example, the release verification unit 450 verifies whether a beacon message is received in the neighboring mesh point, and determines that the neighboring mesh point does not exist when the beacon message is not received in the neighboring mesh point for a predetermined time.

Also, as a result of the verification by the release verification unit 450, when the network is released, the initialization processing unit 440 verifies whether the neighboring mesh point exists, and can directly generate a new MBSS when the neighboring mesh point does not exist.

FIG. 5 is a diagram illustrating a single Wi-Fi interfacing system 500 according to another embodiment of the present invention.

Referring to FIG. 5, the Wi-Fi interfacing system 500 according to the other embodiment of the present invention includes the operation mode determination unit 410 of FIG. 4, the packet processing unit 420 of FIG. 4, a message receiving unit 510, a connection determination unit 520, and a connection processing unit 530.

The message receiving unit 510 receives a beacon message from another network, the connection determination unit 520 determines whether to connect to the other network according to the received beacon message, the connection processing unit 530 either connects to the other network or maintains a present network, as a result of the determining of the connection determination unit 520. As an example, the connection determination unit 520 determines whether to connect to the other network by referring to an SSID list from the received beacon message, or determines whether to connect to the other network by ascertaining signal strength of the received beacon message. Specifically, the connection determination unit 520 can determine to connect to the other network since communication with the other network is effective when the received beacon message has a strength greater than the threshold value.

The Wi-Fi interfacing method according to the above-described embodiment of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

As described above, according to the Wi-Fi interfacing system 500 of the present embodiment, both an access point function and a mesh point function can be simultaneously processed by using a single Wi-Fi interface.

Also, according to the Wi-Fi interfacing system 500 of the present embodiment, manufacturing costs and a size a communication terminal can be reduced since a MAP function is processed by using a single Wi-Fi interface.

Also, according to the Wi-Fi interfacing system 500 of the present embodiment, network communication can be effectively performed since both an access point function and a mesh point function are simultaneously processed by using a single Wi-Fi interface.

Also, according to the Wi-Fi interfacing system 500 of the present embodiment, communication between a station being located in a BSS and a mesh point can be supported by using a single Wi-Fi interface.

Although a few embodiments of the present invention have been shown and described, it would be appreciated by those skilled in the art that changes may be made to these embodiments without departing from the principles and spirit of the invention, the scope of which is defined by the claims and their equivalents.

What is claimed is:

1. A wireless-fidelity (Wi-Fi) interfacing method, comprising:
   determining an interfacing operation mode related to a received packet, in interoperation with the receiving of the packet; and
   processing the packet via a single Wi-Fi interface, according to the determined interfacing operation mode.

2. The method of claim 1, wherein the processing of the packet comprises:
   transmitting the received packet to a basic service set (BSS) object which corresponds to a BSS, and processing the interfacing operation mode as an access point (AP) operation mode.

3. The method of claim 1, wherein the processing of the packet comprises:
   transmitting the received packet to a mesh basic service set (MBSS) object which corresponds to an MBSS, and processing the interfacing operation mode as a mesh point (MP) operation mode.

4. The method of claim 1, wherein the determining of the interfacing operation mode comprises:
   verifying whether the received packet includes network address information about a basic service set (BSS) object, the BSS object corresponding to a BSS; and
   as a result of the verifying, when the received packet includes the network address information about the BSS object, determining the interfacing operation mode as an access point operation mode.

5. The method of claim 1, wherein the determining of the interfacing operation mode comprises:
   verifying whether the received packet includes network address information about a mesh basic service set (MBSS) object, the MBSS object corresponding to an MBSS; and
   as a result of the verifying, when the received packet includes the network address information about the MBSS object, determining the interfacing operation mode as a mesh point operation mode.

6. The method of claim 1, further comprising:
   storing basic service set (BSS) profile information which corresponds to a BSS, and storing mesh basic service set (MBSS) profile information which corresponds to an MBSS, wherein the determining of the interfacing operation mode comprises:
verifying which profile information of the BSS profile information and MBSS profile information corresponds to the received packet; and
as a result of the verifying, either when the received packet corresponds to the BSS profile information, determining the interfacing operation mode as an access point operation mode, or when the received packet corresponds to the MBSS profile information, determining the interfacing operation mode as a mesh operation mode.

7. The method of claim 1, further comprising:
storing basic service set (BSS) profile information which corresponds to a BSS, and storing mesh basic service set (MBSS) profile information which corresponds to an MBSS,
wherein the determining of the interfacing operation mode comprises:
verifying whether a basic service set identifier (BSSID) of the received packet corresponds to the BSS profile information; and
as a result of the verifying, when the BSSID corresponds to the BSS profile information, determining the interfacing operation mode as an access point operation mode.

8. The method of claim 1, wherein the determining of the interfacing operation mode comprises:
verifying whether a basic service set identifier (BSSID) is established as a broadcast address in the received packet and whether a mesh element identifier is included in the received packet; and
as a result of the verifying, when the BSSID is established as the broadcast address in the received packet, and when the mesh element identifier is included in the received packet, determining the interfacing operation mode as a mesh point operation mode.

9. The method of claim 1, wherein the determining of the interfacing operation mode comprises:
ascertaining an address type when the received packet is a data frame; and
determining the interfacing operation mode as the access point operation mode when the ascertained address type is a 3-address frame type, and determining the interfacing operation mode as a mesh point (MP) operation mode when the ascertained address type is a 4-address frame type.

10. The method of claim 1, further comprising:
initializing the single Wi-Fi interface.

11. The method of claim 10, wherein the initializing comprises:
initializing a mesh point (MP) operation mode, and subsequently initializing an access point (AP) operation mode, in the single Wi-Fi interface.

12. The method of claim 1, further comprising:
verifying whether a network with respect to a neighboring mesh point is released;
as a result of the verification, when the network with the neighboring mesh point is released, scanning a basic service set (BSS) object of a BSS or a neighboring mesh point (MP), and initializing a corresponding network according to the scanning; and
initializing the access point operation mode in sequence of the initializing of the network, the access point operation mode providing the BSS.

13. The method of claim 12, wherein the scanning of the neighboring mesh point comprises:

ascertaining whether the neighboring mesh point exists; and
generating a new mesh basic service set (MBSS) when the neighboring mesh point does not exist.

14. The method of claim 13, wherein the ascertaining of whether the neighboring MP exists further comprises:
verifying whether a beacon message is received from the neighboring MP; and
as a result of the ascertaining, when the beacon message is not received for a predetermined time, determining that the neighboring MP does not exist.

15. The method of claim 1, further comprising:
receiving a beacon message;
determining whether to connect to another network according to the received beacon message; and
either connecting to the other network or maintaining a present network, as a result of the determining.

16. The method of claim 15, wherein the determining of whether to connect to the other network comprises:
determining whether to connect to the other network by referring to a server set identifier (SSID) list from the received beacon message.

17. The method of claim 15, wherein the determining of whether to connect to the other network comprises:
ascertaining signal strength of the received beacon message; and
determining to connect to the other network when the ascertained signal strength is greater than a threshold value.

18. A non-transitory computer-readable storage medium storing a program for implementing a Wi-Fi interfacing method, the method comprising:
determining an interfacing operation mode related to a received packet, in interoperation with the receiving of the packet; and
processing the packet via a single Wi-Fi interface, according to the determined interfacing operation mode.

19. A Wi-Fi interfacing system, comprising:
an operation mode determination unit determining an interfacing operation mode related to a received packet, in interoperation with the receiving of the packet; and
a packet processing unit processing the packet via a single Wi-Fi interface, according to the determined interfacing operation mode.

20. The system of claim 19, wherein the packet processing unit transmits the received packet to a basic service set (BBS) object which corresponds to a BSS, and processes the interfacing operation mode as an access point operation mode.

21. The system of claim 19, wherein the packet processing unit transmits the received packet to a mesh basic service set (MBSS) object which corresponds to an MBSS, and processes the interfacing operation mode as a mesh point (MP) operation mode.

22. The system of claim 19, wherein the operation mode determination unit verifies whether the received packet includes network address information about a basic service set (BSS) object, the BSS object corresponding to a BSS, and as a result of the verifying, when the received packet includes the network address information about the BSS object, determines the interfacing operation mode as an access point (AP) operation mode.

23. The system of claim 19, wherein the operation mode determination unit verifies whether the received packet includes network address information about a mesh basic service set (MBSS), object, the MBSS object corresponding to an MBSS, and as a result of the verifying, when the received packet includes the network address information about the MBSS object, determines the interfacing operation mode as a mesh point (MP) operation mode.

24. The system of claim 19, further comprising:
a profile database storing basic service set (BSS) profile information which corresponds to a BSS, and storing mesh basic service set (MBSS) profile information which corresponds to an MBSS,
wherein the operation mode determination unit, by referring to the profile database, verifies which profile information of the BSS profile information and MBSS profile information corresponds to the received packet, and as a result of the verifying, either when the received packet corresponds to the BSS profile information, determines the interfacing operation mode as being an access point (AP) operation mode, or when the received packet corresponds to the MBSS profile information, determines the interfacing operation mode as being a mesh point (MP) operation mode.

25. The system of claim 19, further comprising:
a profile database storing basic service set (BSS) profile information which corresponds to a BSS and mesh basic service set (MBSS) profile information which corresponds to an MBSS,
wherein the operation mode determination unit verifies whether a basic service set identifier (BSSID) of the received packet corresponds to the BSS profile information, and as a result of the verifying, when the BSSID corresponds to the BSS profile information, determines the interfacing operation mode as an access point (AP) operation mode.

26. The system of claim 19, wherein the operation mode determination unit verifies whether a basic service set identifier (BSSID) is established as a broadcast address in the received packet and whether a mesh element identifier is included in the received packet, and, as a result of the verifying, when the BSSID is established as the broadcast address in the received packet, and when the mesh element identifier is included in the received packet, determines the interfacing operation mode as a mesh point operation mode.

27. The system of claim 19, wherein the operation mode determination unit ascertains an address type when the received packet is a data frame, determines the interfacing operation mode as an access point (AP) operation mode when the ascertained address type is a 3-address frame type, and determines the interfacing operation mode as a mesh point (MP) operation mode when the ascertained address type is a 4-address frame type.

28. The system of claim 19, further comprising:
an initialization processing unit initializing the single Wi-Fi interface.

29. The system of claim 28, wherein the initialization processing unit, in the single Wi-Fi interface, initializes a mesh point (MP) operation mode, and subsequently initializing an access point (AP) operation mode.

30. The system of claim 19, further comprising:
a release verification unit verifying whether a network with a neighboring mesh point (MP) is released,
wherein, as a result of the verifying, when the network with the neighboring MP is released, the release verification unit scans a basic service set (BSS) object of a BSS or the neighboring mesh point, and initializes a corresponding network according to the scanning, and initializes an access point (AP) operation mode in sequence of the initializing of the network, the AP operation mode providing the BSS.

31. The system of claim 30, wherein the initialization processing unit ascertains whether the neighboring MP exists, and generates a new mesh basic service set (MBSS) when the neighboring MP does not exist.

32. The system of claim 31, wherein the release verification unit verifies whether a beacon message is received from the neighboring MP, and as a result of the ascertaining, when the beacon message is not received for a predetermined time, determines that the neighboring MP does not exist.

33. The system of claim 19, further comprising:
a message receiving unit receiving a beacon message from another network;
a connection determination unit determining whether to connect to the other network according to the received beacon message;
a connection processing unit either connecting to the other network or maintaining a present network, as a result of the determining.

34. The system of claim 33, wherein the connection determination unit determines whether to connect to the other network by referring to a server set identifier (SSID) list from the received beacon message.

35. The system of claim 33, wherein the connection determination unit ascertains signal strength of the received beacon message, and determines to connect to the other network when the ascertained signal strength is greater than a threshold value.

* * * * *